United States Patent [19]

Langer

[11] Patent Number: 4,930,969

[45] Date of Patent: Jun. 5, 1990

[54] RAIL LIFT GATE APPARATUS AND STORAGE SCHEME

[76] Inventor: Hartford P. Langer, 2074 Edgerton St., St. Paul, Minn. 55117

[21] Appl. No.: 231,228

[22] Filed: Aug. 11, 1988

[51] Int. Cl.$^5$ .............................................. B60P 1/44
[52] U.S. Cl. .................................. 414/540; 187/9 R
[58] Field of Search ............... 414/545, 559, 539, 540, 414/557, 558, 921; 187/9 R

[56] References Cited

U.S. PATENT DOCUMENTS

| | | | |
|---|---|---|---|
| Re. 31,157 | 2/1983 | Perkins | 414/545 |
| 561,822 | 6/1896 | Shadbolt . | |
| 1,630,473 | 5/1927 | Ducondu . | |
| 2,589,654 | 3/1952 | Archer . | |
| 3,251,488 | 5/1966 | Robinson et al. | 414/558 |
| 3,258,140 | 6/1966 | Appleman . | |
| 3,263,835 | 8/1966 | Lugash . | |
| 3,369,678 | 2/1968 | Robinson . | |
| 3,517,838 | 6/1970 | Lugash . | |
| 3,528,574 | 9/1970 | Denner et al. | 414/558 |
| 3,734,239 | 5/1973 | Martin et al. | 414/545 X |
| 3,737,055 | 6/1973 | Pettit | 414/558 |
| 3,791,541 | 2/1974 | Himes | 187/9 R X |
| 3,795,329 | 3/1974 | Martin et al. | 414/545 |
| 4,007,844 | 2/1977 | Perkins . | |
| 4,078,676 | 3/1978 | Mortenson . | |
| 4,113,121 | 9/1978 | Collins et al. | 414/545 |
| 4,563,121 | 1/1986 | Drews | 414/545 |
| 4,576,541 | 3/1986 | Dunn et al. | 414/545 |
| 4,579,503 | 4/1986 | Disque | 414/558 |
| 4,627,784 | 12/1986 | Collins | 414/450 |
| 4,806,062 | 2/1989 | Stier | 414/545 |

FOREIGN PATENT DOCUMENTS

| | | | |
|---|---|---|---|
| 3420422 | 5/1985 | Fed. Rep. of Germany | 414/921 |
| 7906530 | 3/1981 | Netherlands | 414/540 |
| 2132582 | 7/1984 | United Kingdom | 414/545 |
| 2190649 | 11/1987 | United Kingdom | 414/558 |

OTHER PUBLICATIONS

"Waltco F-Series Heavy Duty Flipaway", manufactured by Waltco Truck Equipment Co.
"Railgate Cylinder Securing System", manufactured by Maxon Industries, Inc.
"Tommy Gate Series 1500 Hydraulic Lifts", Tommy Gate Series 1000 Lift-N-Dump Hydraulic Lifts, Tommy Gate Series 1000 Mini Tommy Lift Hydraulic Lifts, manufactured by Woodbine Manufacturing Co.
"Truck Utilities Offers Waltco Liftgates the Ones You Can Count On".
"Waltco Truck Equipment Co., RGL & RGL Serial II".

Primary Examiner—Robert J. Spar
Assistant Examiner—Robert S. Katz
Attorney, Agent, or Firm—Merchant, Gould, Smith, Edell, Welter & Schmidt

[57] ABSTRACT

A rail type lift apparatus 10 for vehicles utilizing a platform 11 which is capable of being stored automatically beneath the bed of the vehicle. The apparatus utilizes adjustable lever arms 25 hingedly attached to platform 11 for selective engagement with engagement members 61. When engaged, lever arms 25 impart a rotational force on platform 11. Due to this force, platform 11 rotates about its pivotal connection and through rails 23 to a stored position. Platform 11 is hinged at its midpoint, to facilitate folding, thereby conserving the area required for storage. The support assembly supports platform 11 in its stored position and helps propel platform 11 to its operative position. The support assembly also ensures that stop 92 is appropriately aligned securing platform 11 in its stored position. A hydraulic cylinder 80 is used to actuate the apparatus 10.

17 Claims, 5 Drawing Sheets

RAIL LIFT GATE APPARATUS AND STORAGE SCHEME

FIELD OF THE INVENTION

This invention relates generally to a lift apparatus for vehicles such as freight trucks, vans, railroad cars and the like. The invention relates particularly to the type of lift apparatus wherein a lift platform is raised via elevator members located on rails attached to such vehicles.

BACKGROUND OF THE INVENTION

The utilization of an automatic lift apparatus in connection with railroad cars, trucks, and other similar vehicles to aid in loading and unloading is well known in the art. Such an apparatus is often essential when a loading dock is unavailable or inconvenient. Further, use of such an apparatus increases productivity by permitting easier handling of bulky, unwieldy, palletized or other heavy loads. The apparatus must be strong in order to achieve a large load lifting capacity. However, the apparatus must not weigh so much that it significantly decreases the load carrying capacity of the vehicle. Therefore, there are competing design concerns for such an apparatus. The apparatus load capacity must be tempered by the weight that the apparatus adds to the vehicle. Other design factors the apparatus' convenience of use and durability.

One type of lift apparatus is the hydraulic self-storing style. These lifts are often capable of moving to a stored position under the bed of the vehicle. Such lifts typically employ a pair of hydraulically powered parallelogram linkages to support the lift platform. These lifts, however, are dependent upon rear axle location due to their mounting requirements. The lifts are typically also constructed of heavy steel to withstand the torsional forces exerted by the load when lifting the lift platform. These forces also require the platforms to be loaded evenly to avoid binding. Further, since the lift platform usually passes through the linkages about a pivotal connection when storing, the platforms often rattle in their stored positions. As the vehicle passes over uneven surfaces, this rattling exerts considerable force on the pivotal connections. This style of lift does have the advantage, though, in that they are stored under the bed of the vehicle, thereby allowing the vehicle to directly back up to a loading dock. Other styles of lifts, including rail lifts, require the additional step of moving the lift apparatus into a loading dock position from its storage position before backing up to a loading dock.

Rail lift systems solve many of the problems experienced by the hydraulic self-storing style lifts. Rail lifts are typically lighter in weight, have a more evenly distributed lift, and are less prone to bouncing and rattling when in their stored positions. Typically, these lifts utilize a platform supported at the platform's edge closest to the vehicle by the lower portion of elevator members connected to opposing vertical rails. Support members at the platform's edge furthest away from the vehicle are attached to the upper portion of the elevator members. In this manner, rail lifts raise the platform from each of the platform's four corners, thereby providing a more uniform lift.

To store rail lift style platforms, typically the platform is moved from a horizontal to a vertical position against the rear of the vehicle. In this position the lift hinders the loading and unloading of the vehicle. Further, since the lift is often not required when a loading dock is present, these lifts require that the operator of the vehicle move the lift to a "loading dock" position prior to backing up to a loading dock. This loading dock position usually encompasses moving the platform from a vertical position against the rear of the vehicle, to a vertical position directly beneath its original stored position but below the horizontal plane formed by the bed of the vehicle. This position typically decreases the vehicle's ground clearance. Therefore, these types of lifts often encounter problems if the ground close to the loading dock is uneven. Further, the operator of the vehicle is typically unable to back up completely to the dock without potentially damaging the rail lift.

A rail lift designed by Collins (U.S. Pat. No. 4,627,784) attempted to solve several of these problems associated with rail lifts in connection with side doors of railroad cars. The Collins rail lift utilizes a "swing-away" lift apparatus. In this device, the lift rails and platform swing as a unit to a position parallel and slightly beneath the plane formed by the railroad car bed. The whole assembly is pushed under the bed of the railroad car to be stored when not in use. The device is located on the side of the railroad car at the car's approximate midpoint, thereby fitting between the railroad car axles. However, this device is not practical for a rear loading vehicle since there is limited room beneath the rear end of most vehicles due to axle placement. This is especially the case in many trucks. Further, this lift is very complicated in its operation and storage.

Therefore, there exists a need to develop a rail lift which is stored in a position beneath the rear portion of a vehicle bed while not limiting ground clearance, disturbing axle placement, or requiring an additional transfer step when a loading dock is available.

SUMMARY OF THE INVENTION

A preferred embodiment of an apparatus constructed according to the principles of the present invention includes a rail lift apparatus which provides for folding the lift platform under the bed of the vehicle to a stored position when not in use. In a preferred embodiment, a lever arm is mounted on opposing side edges of a lift platform to selectively engage with rollers mounted on the interior sides of a set of parallel vertically opposing rails. When the lift platform is raised with the lever arms selectively engaged with the rollers, a rotational force is created. This force causes the platform to rotate through the opposing rails and under the bed of the vehicle. The platform rotates about pivotal connections between the lift platform and a pair of elevator members slideably connected to the opposing rails. The lift platform, which is hinged at its midpoint, rotates approximately 180° about the pivotal connection, moving into a folded, stored position under the vehicle bed.

The platform is hinged so as to allow the bottom of the lift platform to fold together, yet remain stable while lifting loads in its operational state. By folding the lift platform at its approximate midpoint, less space is required in which to store the lift platform under the vehicle bed.

Another feature of a preferred embodiment of the present invention is the inclusion of a support assembly for assisting in unfolding the lift platform from its stored position. The lift platform in its stored position rests on the support assembly thereby biasing a spring. When the lift platform is moved to an operational position from its stored position, the springs propel the platform from its folded position so that it is ready for use without requiring manual assistance.

A further feature of the preferred embodiment is a pair of support arms connected to the elevator members and the side edges of the rear portion of the platform (i.e. at points furthest away from the back of the vehicle). These support arms provide for a more balanced lifting action while the lift gate apparatus is in operation. The support arms are hinged to allow for folding the platform.

Yet another feature of the invention is a beveled rear edge of the platform to allow for easy loading of loads onto and off of the platform. The lift also features a locking device for providing that the platform cannot be moved from its stored position.

The apparatus also features a single handle for controlling the hydraulic actuating means for one hand operation. An operator is thereby able to raise or lower the lift by operating the single handle.

Therefore, according to one aspect of the invention, there is provided a rail type lift, suitable for attachment to a vehicle, comprising: (a) opposed elongate members arranged in a substantially vertical manner; (b) a platform having a surface which is generally horizontally disposed, whereby said platform's horizontal disposition defines an operating position; (c) means for operatively connecting said platform to said elongate members; (d) means for raising and lowering said platform relative to said elongate members; (e) means for moving said platform to a stored position whereby said stored position is transversely opposed with respect to said operating position relative to said elongate members whereby said elongate members remain in a substantially vertical position.

According to a further aspect of the invention, there is provided a rail type lift apparatus wherein said connection means allows said platform to rotate about said connection means and between said elongate members. According to another aspect of the invention, there is provided the rail type lift apparatus wherein said means for moving said platform includes: (a) lever means, adjustably connected to said platform, for selective adjustment in a first position or a second position; and (b) lever engagement means, connected to said elongate members, for engaging said lever means when said lever means are in said first position and for exerting a force on said platform when said platform is raised, whereby said platform is rotated about said connection means and between said elongate members to said stored position.

These and other features and advantages which characterize the invention are pointed out with particularity in the claims annexed hereto and forming a part hereof. However, for a better understanding of the invention, its advantages and objectives obtained by its use, reference should be had to the following detailed description and the accompanying Drawings in which there is illustrated and described a preferred embodiment of the invention.

BRIEF DRAWINGS OF THE DRAWINGS

Referring to the Drawings, wherein like numbers represent like parts throughout the several views.

DETAILED DESCRIPTION

Figure 1:
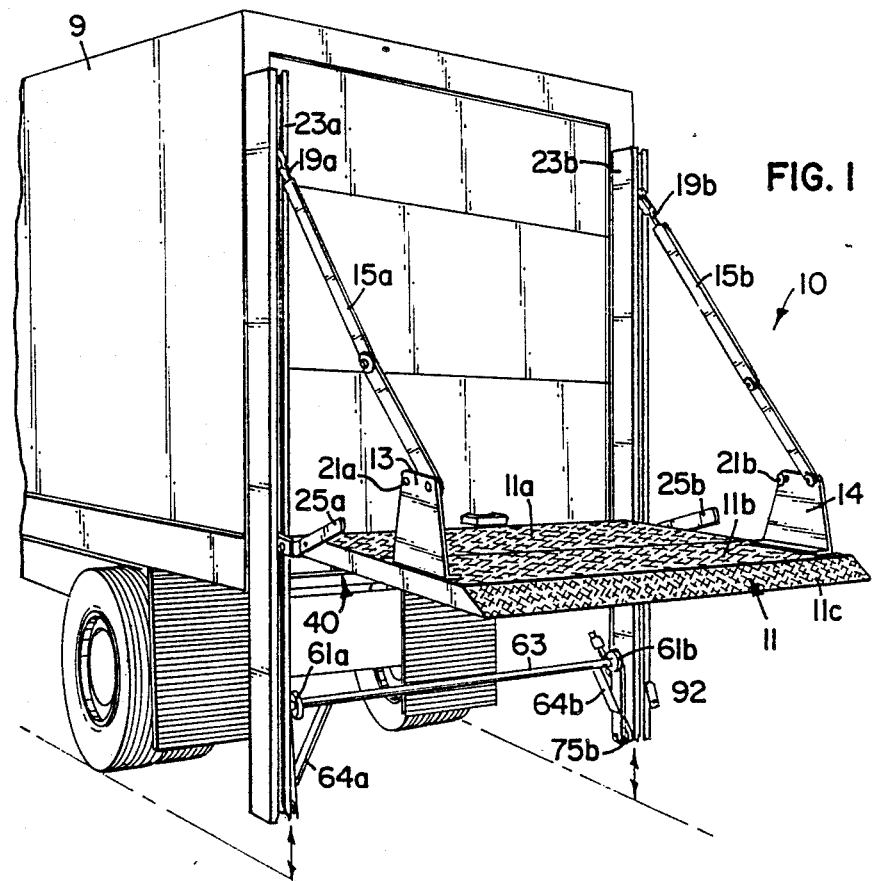
FIG. 1 is a perspective view of a preferred embodiment constructed according to the principles of the present invention in an operational up position mounted on a truck.

The principles of this invention apply particularly well to its application to a folding rail lift apparatus, for simplicity hereinafter referred to as the rail lift. An example of a preferred embodiment of a rail lift constructed according to the principles of the present invention is illustrated in FIG. 1. The rail lift is shown generally at 10 cooperatively mounted on truck 9. Although a truck 9 is used for illustration, it should be noted that other vehicles and loading dock type operations are within the scope of this invention.

Rails 23a and 23b are mounted on either side of the rear door on truck 9 so as not to interfere with the operation of the door. Rails 23 are connected to one another by connecting member 40. Together, rails 23 and connecting member 40 form an H-shape. In the preferred embodiment the rails have an outside diameter of $2\frac{1}{2}$ inches by $2\frac{1}{2}$ inches. Those skilled in the art will recognize that other mounting techniques, including mounting the rails on the sides of the truck, are simply a matter of design choice. The Figs. illustrate connecting member 40 as being open, however, a suitable cover piece (not shown) may be used to further shield the cylinder and pulleys described below. Further, shock absorbent material (not shown) such as rubber may be mounted on rails 23 to provide protection against damage to lift 10 when backing into loading docks or other obstacles.

Within each rail 23a and 23b is a slideably mounted elevator member 31 (best seen in FIG. 6) to which lift platform 11 and support arms 15a and 15b are attached. Mounted on each elevator member 31, at its upper end, is a vertically aligned tab with a hole formed therethrough. These tabs extend through channels running lengthwise in rails 23a and 23b. Clevises 19a and 19b are attached to the tabs and secured with locking pins. Clevises 19a and 19b are threaded at the end opposite the locking pin to allow for insertion into threaded members.

Threadably attached to clevises 19a and 19b are support arms 15a and 15b respectively. Support arms 15a and 15b each consist of a first length and a second length. The first length is a narrow band which may be constructed of any material which provides the required material strength. In the preferred embodiment, steel with approximate dimensions of $\frac{3}{8}$ inches $\times 1\frac{1}{4}$ inches and 34 inches long, with a hole formed therethrough in one end and a length of threaded rod attached on the second end. The threaded rod on support arms 15a and 15b is inserted in clevises 19a and 19b to provide for adjusting the length of the support arms 15.

The second lengths of support arms 15a and 15b are also a narrow band which may be constructed of any material which provides the required material strength. In the preferred embodiment a length of steel is used, with approximate dimensions of ⅜ inches ×1¼ inches and 17 inches long. The second lengths have holes formed at each end. The second lengths are attached to the corresponding first lengths. In the preferred embodiment, standard bolts, nuts and washers are used to attach the two lengths to one another. However, any connector device may be used which allows support arms 15a and 15b to freely pivot about one another while the lift gate 10 is moved from its operative position to its stored position, yet allows support arms 15 to provide lift to the rear portion of platform 11.

Support arms 15a and 15b are connected to lift platform 11 via side members 13 and 14 respectively. Side members 13 and 14 are attached vertically to platform 11 in a manner which is parallel and adjacent to the lift platform's 11 side edges. Members 13 and 14 are mounted such that they extend from the approximate midpoint of lift platform 11 and extend toward the rear of lift platform 11. In the preferred embodiment, side members 13 and 14 are made of aluminum and are a trapezoidal shape when viewed from a side of the lift platform 11. The edge nearest the vehicle when in an operational position is parallel with the plane formed by the rear edge of the truck, while the top edge and bottom edge of the bracket are parallel to each other and platform 11. The edge of members 13 and 14 furthest from the back of the truck in an operational position has a tapering edge away from the rear of the truck 9. Located near the top of members 13 and 14, at points adjacent to the two upper corners, and at approximately the same elevation above platform 11 are two support arm folding stops 21a and 21b. These stops are oppositely disposed from one another and slightly extend through members 13 and 14 over lift platform 11 toward one another. Connected to members 13 and 14, at the upper corner opposite the support arm folding stops 21a and 21b, are support arms 15a and 15b. The second lengths of support arms 15a and 15b are secured in the preferred embodiment with a locking pin arrangement which allows them to rotate about the locking pin until stopped by contact with support arm folding stops 21a and 21b.

Platform 11 is constructed in three sections, the first section 11a being closest to the rear of the vehicle when in an operational position and compromising approximately one-half of the entire platform area. The second section of lift platform 11 is section 11b, briefly described above in connection with side members 13 and 14. The second section 11b of lift platform 11 is hingedly attached by hinge 12, located at the bottom portion of the platform, to first section 11a. The third section of platform 11 is a beveled section 11c. This section is an extension of second section 11b and provides a tapering edge for access onto platform 11.

Platform 11, in the preferred embodiment, is made of aluminum with a raised tread in order to ensure footing. Under the platform deck 11 is a series of support members connected at the sides of lift platform 11 to framing members. This construction allows the rail lift 10 to be extremely light due to the aluminum decking, while providing a rigid strong platform. In the preferred embodiment, the support and framing members are constructed of steel reinforced aluminum. Two-inch by two-inch aluminum square tubing is used. The platform 11 is approximately 90 inches wide and 48 inches deep. Those skilled in the art will recognize that these dimensions, as well as other dimensions herein, are solely for the purpose of describing a preferred embodiment of the invention described herein.

Figure 6:
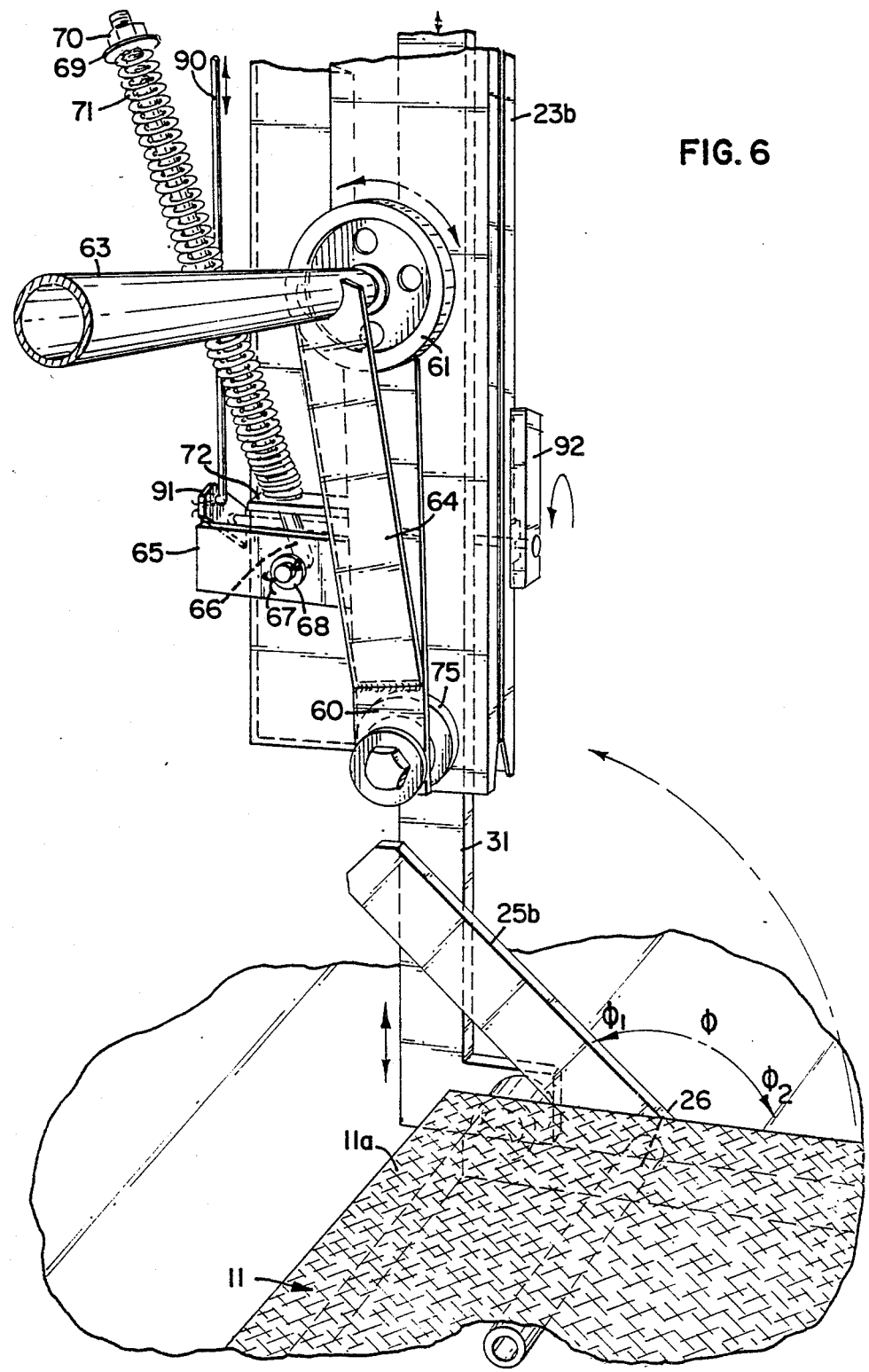
FIG. 6 is a perspective view of the support assembly and a portion of the platform with parts broken away of the apparatus illustrated in FIG. 1.
Figure 7:
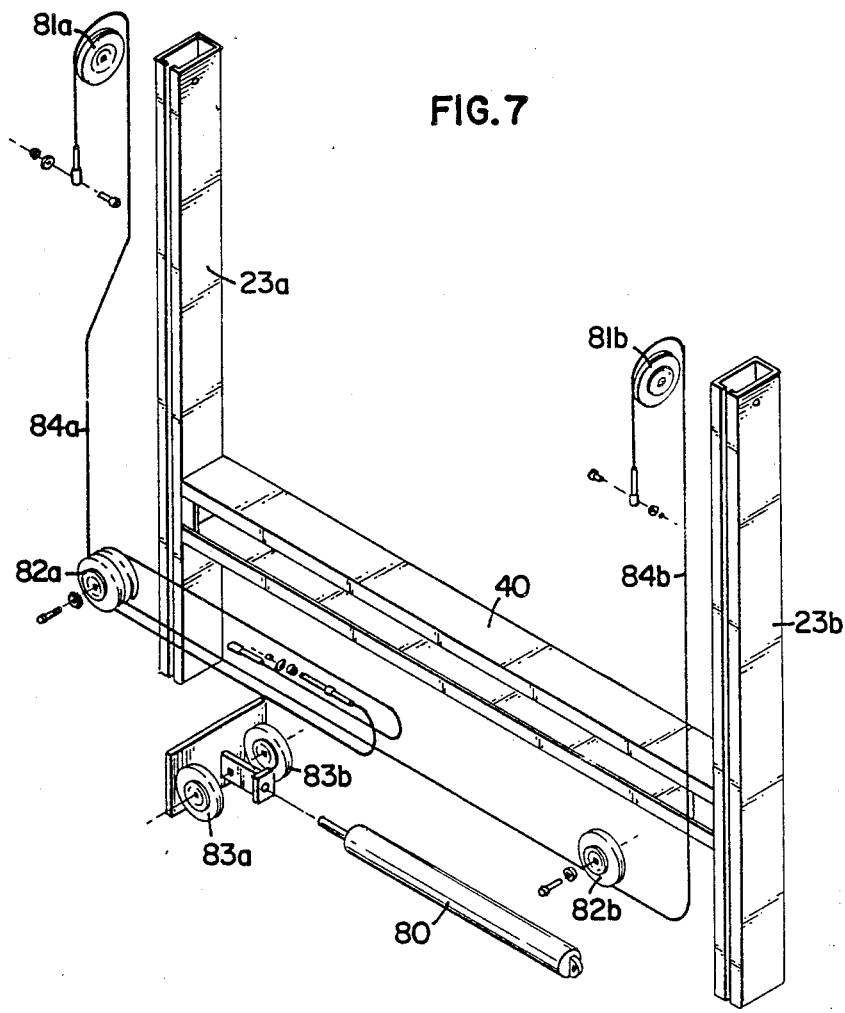
FIG. 7 is an exploded perspective view with portions of the apparatus illustrated in FIG. 1 broken away.

As best seen in FIG. 6, attached to platform 11 at first section 11a are lever arms 25a and 25b. These lever arms are cooperatively connected to one another with a connecting rod 26. The rod extends through holes formed in the framing members of platform 11. Lever arms 25a and 25b may be moved selectively through a radius $\phi$; between a first position $\phi_1$, wherein the longitudinal axis of the lever arm 25a and 25b forms a 45° angle with the plane formed by platform 11 (first or forward position) and a second position $\phi_2$ wherein the longitudinal axis of the lever arms 25 and 26 forms a 0° angle with the plane formed by platform 11 (second or back position).

It will be understood that for illustration and description purposes, only one lever arm 25 and one side of the support assembly is shown in FIG. 6. However, in the preferred embodiment, a lever arm 25 and support assembly is provided on the other side edge of platform 11. Therefore, the accompanying description of one lever arm 25 and one side of the support assembly should not be used to limit the invention described herein.

Attached to the inner portion of rails 23a and 23b is the support assembly. The support assembly supports lift platform 11 in its stored position and aids in moving the platform 11 from its stored position to its operative position. The assembly includes means for supporting platform 11 and biasing means for propelling platform 11 to its operating position.

Biasing arms 60 which is attached to rail 23 so as to rotate freely about one end. Attached to the second end of the biasing arm is an engagement member 61 to cooperatively contact the platform in its stored position. In the preferred embodiment, engagement member 61 is a circumferential roller. This roller rotates about its hub 62. Attached between the rollers 61 is a stationary axle 63 which extends between the two circumferential rollers 61 and is rigidly attached to biasing arm 60. The longitudinal axis of axle 63 forms right angles to the longitudinal axis of lever arms 60 at its points of engagement.

To strengthen the connection between biasing arm 60 and axle 63, an angle brace 64 is attached to the first end of biasing arm 60 and at a distance toward the center of axle 63 from hub 62. The angle brace 64 may be attached to the axle 63 and stationary arms 60 by any number of methods, the preferred embodiment is welded, with the angle brace 64 forming a hypotenuse of a right triangle formed by the angle brace 64, biasing arm 60 and axle 63.

Also connected to biasing arm 60 is biasing tab 65. Tab 65 is attached to biasing arm 60 at the proximate midpoint of arm 60. Biasing tab 65 extends at an approximate right angle toward the front of rail lift 10 and is attached to the outer side of biasing arm 60. Connected to biasing tab 65 is rod 66 which is inserted through biasing arm 65 so that it may freely rotate about a perpendicular segment inserted through a hole formed through biasing tab 65. In the preferred embodiment, the rod 66 is held in place via a washer 68 and cotter pin 67 arrangement. The rod 66 extends through compression plate 72 and is threaded on its second end to receive nut 70 and washer 69. Spring 71 is inserted over rod 66 and is held in place by washer 69 and compression plate 72 in a decompressed state. Those skilled in the art will recognize that the choice and arrangement of the biasing mechanism, including the use of a spring which is compressed or decompressed in a particular state, is a matter of design choice.

Compression plate 72 is connected to the interior sides of rails 23 and is situated such that biasing arm 60 can rotate between rails 23 without striking compression plate 72. Further, in operation, spring 71 is compressed between washer 69 and compression plate 72 as biasing arm 60 pivots forward between rails 23. Spring 71 causes the biasing assembly to tend toward a vertical state when the rail lift 10 is in its operative state.

Mounted between biasing arms 60 and the respective rail 23 are lever arm engagement means 75. These engagement means 75 are mounted at the first end of biasing arm 60. The engagement means 75 are located such that they do not impede the movement of the support assembly. In the preferred embodiment the engagement means 75 are roller bearings, however, any number of styles of devices could be used including steel tabs, the design consideration for the engagement means being that it is constructed of a material of sufficient strength to engage with lever arm 25, as described below.

As is well known in the art, any number of devices can be utilized to move lift platform 11 between its operational stages and operational and stored states. Such devices can include power-take-offs from the vehicles propulsion system, electric motors, or hydraulic actuated systems. In the preferred embodiment, a hydraulic pump is used in connection with a 12-Volt battery. Hydraulic pump systems are well known in the art and will not be described further other than to provide that in the preferred embodiment hydraulic pump of the sort manufactured by Stone Inc. (not shown) with a capacity to pump 3 gallons per minute is used. Further, the electrical energy required for the hydraulic pump may come from any number of sources including a separate battery or generator, or from the power system of the vehicle in which lift platform 11 is located. The hydraulic pump activates a hydraulic cylinder 80 which is located in the proximate midpoint of rail lift 10. The location in the preferred embodiment is within connecting member 40. The cylinder 80 is arranged horizontally. Hydraulic cylinders are also well known in the art and so will not be described further. The hydraulic cylinder used in the preferred embodiment of the present invention is a single action type cylinder manufactured by Prince Inc. and designated by model number 324. The cylinder has a three inch bore with a twenty-four inch stroke. Those skilled in the art will recognize that the location of the hydraulic cylinder 80, pulleys, and cables used to lift platform 11 are a matter of design choice. The type of cylinder 80 and pump used are similarly a matter of design choice and application of the lift 10.

As the hydraulic motor causes cylinder 80 to expand, the lift platform 11 is raised by raising the elevator members 31 within rails 23. Two pulleys 81 are located at the upper end of rails 23. The pulleys 81 are mounted with their diameter being aligned perpendicular to the direction in which cylinder 80 expands. However, those skilled in the art will recognize that the manner of alignment of pulleys 81 is a matter of design choice. A second set of pulleys 82 are located at the opposing edges of rails 23 in an alignment which is parallel to the expansion of cylinder 80. This second set of pulleys 82 are located at the ends of cross member 40. A third set of pulleys 83 are mounted on the expansion portion of cylinder 80. Two cables 84a and 84b are then connected around pulleys 83 and connected at one end to cylinder 80. The second end of cables 84 are then looped around pulleys 82 and 81 and suitably connected to the upper portion of the elevator members 31.

Alternatively, gears may be used in lieu of pulleys 81, 82 and 83, with roller chain replacing cables 84. This alternative arrangement avoids the potential fraying and breaking of cables 84. Therefore, use of gears and roller chain may increase safety. The use of one embodiment over the other is a matter of design and so for convenience use of cables and pulleys will be described.

As is well known in the art, in operation, as cylinder 80 expands, the cables 84 are forced to cover a greater distance between the expanding end of cylinder 80 and pulleys 82. Therefore, elevator members 31 are raised within rails 23, causing lift platform 11 to rise. To lower the platform, cylinder 80 is allowed to retract, thereby shortening the distance required by cables 84 to cover and lowering elevator members 31.

Therefore, referring now to FIGS. 2, 3, 4 and 5, the stages of moving lift platform 11 between its operational and stored states may be described as follows: First, as illustrated in FIG. 4, hydraulic cylinder 80 is fully retracted when lift platform 11 is in its lower stage of its operational state. Further, spring 71 is fully decompressed. To begin the process, lever arms 25a and 25b are moved to a first position $\phi_1$ (toward the front of lift platform 11) directly beneath the lever engagement means 75. The hydraulic pump is then actuated, thereby expanding hydraulic cylinder 80. As noted above, this causes lift platform 11 to be lifted to a position off the ground and forces lever arms 25a and 25b into contact with the engagement means 75. This contact causes lever arms 25a and 25b to exert a rotational force on platform 11 causing it to rotate about its hinged axis. Since lift platform 11 is hinged between first section 11a and second section 11b, gravitational force causes second section 11b to tend to remain lower than platform 11's midpoint.

Figure 3:
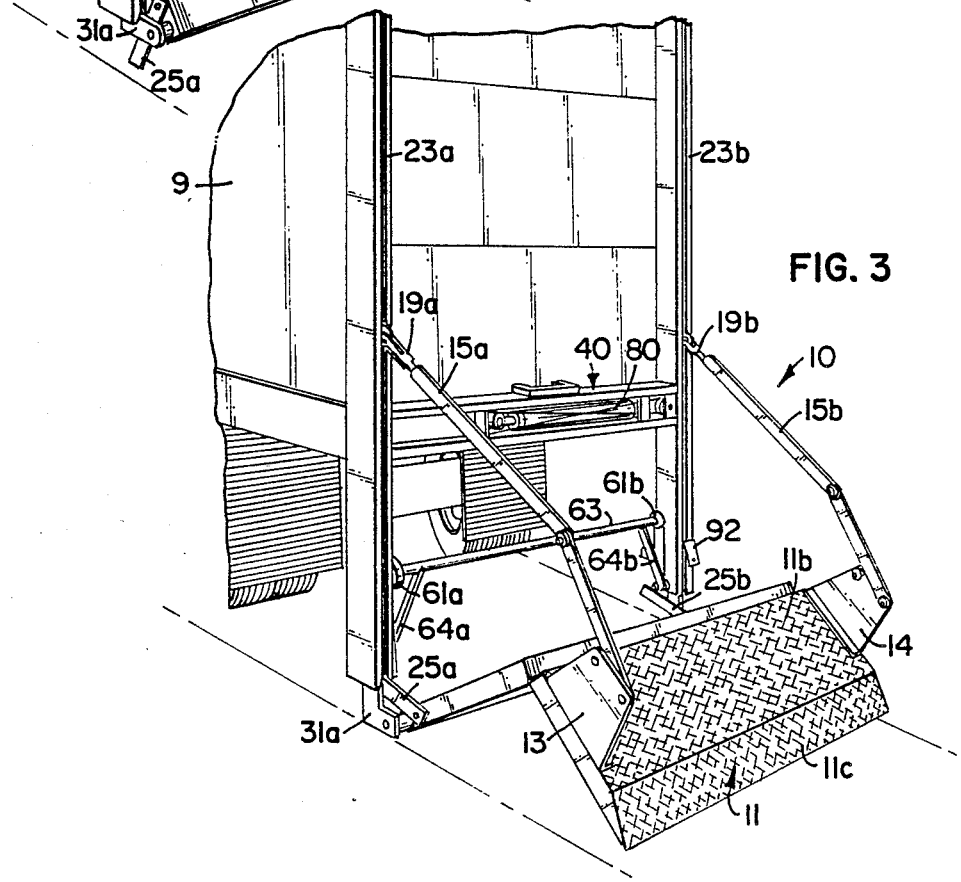
FIG. 3 is a perspective view of the apparatus illustrated in FIG. 1 in a second intermediate operational state.
Figure 4:
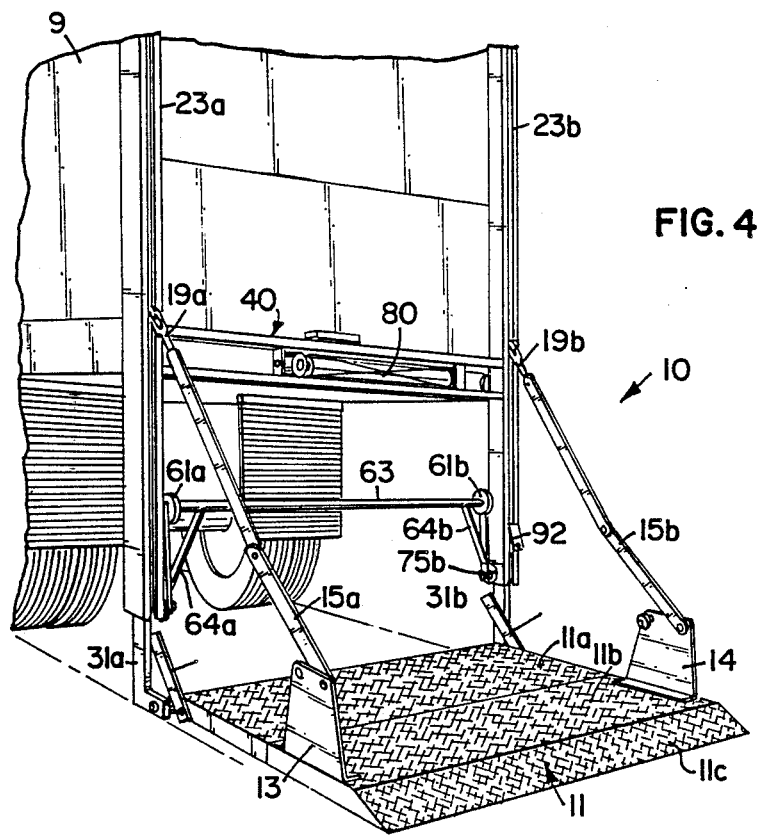
FIG. 4 is a perspective view of the apparatus illustrated in FIG. 1 in an operational down position.

As best illustrated in FIG. 3, at the folding process's midpoint lever arms 25a and 25b are in contact with the engagement means 75, the first portion 11a of lift platform 11 is rotating about lift platform 11 axis 11a with its midpoint elevated, and the second section of lift platform 11 is tending to remain lower than midpoint of lift platform 11. Support arms 15 are moved to a slightly bent position from their straight line position in the operational state. The arms 15 are bent when they come in contact with support arm folding stops 21. This insures that the support arms 15 are folded in the correct manner and do not interfere with the folding process.

Figure 2:
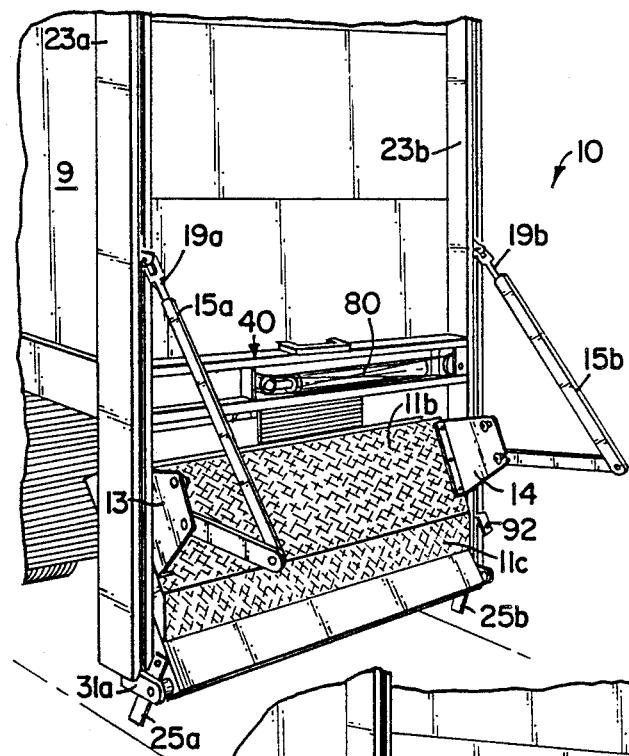
FIG. 2 is a perspective view of the apparatus illustrated in FIG. 1 in a first intermediate operational state.

Referring now to FIG. 2, first section 11a and second section 11b of lift platform 11 are folded against one another. The lever arms 25 are in contact with the engagement means 75 at a point closest to lever arms, base and first section 11a is in contact with wheel 61. Spring 71, at this point, is slightly compressed between washer 69 and compression plate 72. Platform 11 continues to be raised by elevator members thereby drawing lever arms 25 up the roller bearings and thereby transferring more weight to the biasing mechanism assembly.

Figure 5:
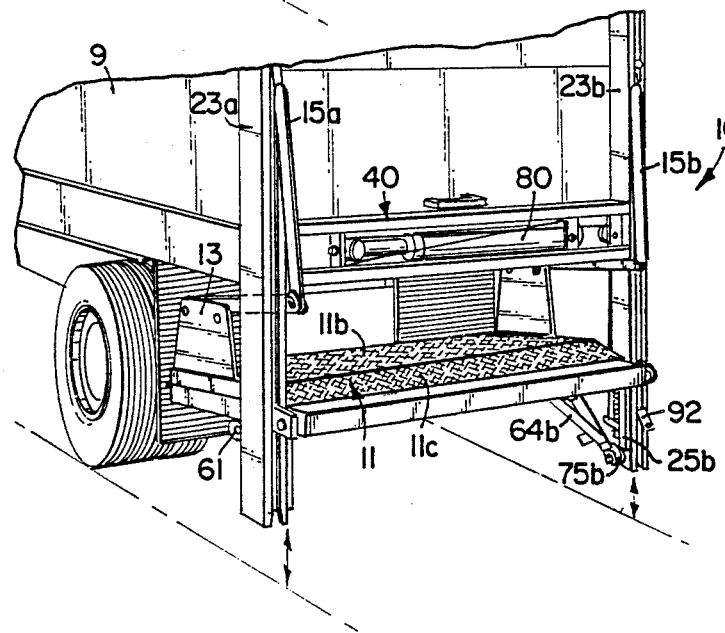
FIG. 5 is a perspective view of the apparatus illustrated in FIG. 1 in a stored position.

The lift gate 10 stored state is best illustrated in FIG. 5. Here support arms 15 and platform 11 are each in their fully stored, folded position. Lever arms 25 are in contact with the engagement means 75 at their tips. Lift platform 11 at this stage fully biases the biasing assembly mechanism with spring 71 fully compressed.

To unfold the lift platform 11, the procedure is reversed, with the hydraulic cylinder being compressed. The spring biasing mechanism aids in lift platform 11 being propelled to an operational state by propelling lift platform 11 rearward. This action eliminates the need to manually unfold the sections of platform 11.

To use the platform 11 in its operational state, lever arms 25 are rotated about their axes to a second position $\phi_2$. This position is their normal operational position.

The rail lift 10 also includes a platform stop 92 which is used to prevent lift platform 11 from moving from its stored position during transit. Stop 92 is lowered so that its longitudinal axis is in a horizontal position. This provides a stop across the face of the channel in rail 23b for elevator member 31. Thereby elevator member 31 is maintained at an elevation above stop 92, when stop 92 is lowered.

Stop 92 is pivotally connected to stop tab 91, which is connected to stop rod 90. Stop rod 90 is connected to a handle (not shown) which may be raised when moving lift 10 from a stored to an operational position. Biasing tab 65 maintains contact with stop tabs 91 when platform 11 is in its operational position, due to spring 71. This contact causes stop 92 to remain aligned with its longitudinal axis in a vertical position, thereby ensuring that stop 92 does not interfere with platform 11 during operation.

It is to be understood that even though numerous characteristics and advantages of the present invention have been set forth in the foregoing description, together with details of the structure and function of the invention, the disclosure is illustrative only. Other modifications and alterations are well within the knowledge of those skilled in the art and are to be included within the broad general meaning of the terms in which the appended claims are expressed.

I claim:

1. A rail type lift, suitable for attachment to a vehicle, comprising:
    (a) opposed elongate members arranged in a substantially vertical manner, said elongate members defining a substantially vertical mean plane;
    (b) a platform having a surface which is generally horizontally disposed, whereby said platform's horizontal disposition defines an operating position;
    (c) means for operatively connecting said platform to said elongate members, said connection means being substantially within said mean plane;
    (d) means for raising and lowering said platform and said connection means relative to said elongate members; and
    (e) means for moving said platform to a stored position whereby said stored position is transversely opposed with respect to said operating position relative to said elongate members whereby said elongate members remain in a substantially vertical position, and wherein said connection means remain substantially within said mean plane and operatively connected to said platform.

2. The rail type lift apparatus according to claim 1, wherein said connection means allows said platform to rotate about said connection means and between said elongate members.

3. The rail type lift apparatus according to claim 2, further comprising support means for supporting said platform in said stored position and for propelling said platform from said stored to said operational position.

4. The rail type lift apparatus according to claim 3, wherein said support means includes:
    (a) an engagement member for cooperative engagement to said platform when said platform is in said stored position;
    (b) a bias element connected to said engagement member; and
    (c) a compression plate connected to said engagement member and said bias element, whereby when said engagement member is in contact with said platform, said bias element is compressed by said compression plate.

5. A rail type lift, suitable for attachment to a vehicle, comprising:
    (a) opposed elongate members arranged in a substantially vertical manner;
    (b) a platform having a surface which is generally horizontally disposed, whereby said platform's horizontal disposition defines an operating position;
    (c) means for operatively connecting said platform to said elongate members; said connection means allows said platform to rotate about said connection means and between said elongate members;
    (d) means for raising and lowering said platform relative to said elongate members;
    (e) means for moving said platform to a stored position whereby said stored position is transversely opposed with respect to said operating position relative to said elongate members whereby said elongate members remain in a substantially vertical position wherein said means for moving said platform includes:
        (i) lever means, adjustably connected to said platform, for selective adjustment in a first position or a second position; and
        (ii) lever engagement means, connected to said elongate members, for engaging said lever means when said lever means are in said first position and for exerting a force on said platform when said platform is raised, whereby said platform is rotated about said connection means and between said elongate members to said stored position.

6. The rail type lift apparatus according to claim 5, wherein said platform includes a front edge and a rear edge and wherein said platform is hinged to provide for said platform to fold, whereby said platform's front edge and rear edge are adjacent.

7. The rail type lift apparatus according to claim 6, further comprising support means for supporting said platform when in said stored position and for propelling said platform from said stored to said operational position.

8. The rail type lift apparatus according to claim 5, further comprising a vehicle and whereby said elongate members are cooperatively connected to said vehicle.

9. The rail type lift apparatus according to claim 8 wherein said vehicle includes a generally horizontal load carrying surface and said stored position is located below said horizontal surface.

10. A lift gate apparatus, suitable for attachment to a vehicle of the type having a generally horizontal load carrying surface, comprising:
    (a) two opposed parallel rails, said rails cooperatively attached to one another by a cross member, said rails aligned in a substantially vertical manner and said rails having a longitudinal channel formed therein;

(b) interior rails slidably mounted in said channels;

(c) a platform having a front edge, a rear edge, and a first and second side edge said platform having a generally horizontal operative position;

(d) means for cooperatively connecting said platform along said first and second side edges to said interior rails, wherein said platform is rotatable about said connection means and between said rails and said interior rails;

(e) means for raising and lowering said interior rails relative to said opposed parallel rails, whereby said platform is also raised and lowered; and (f) storing means, cooperatively connected to said rails and said platform, for moving said platform to a stored position, wherein said platform is rotated about said connection means and between said rails and said interior rails, whereby said parallel rails remain in their opposed, substantially vertical position and said stored position is beneath the plane formed by the load carrying surface of the vehicle.

11. A lift gate apparatus, suitable for attachment to a vehicle of the type having a generally horizontal load carrying surface, comprising:

(a) two opposed parallel rails, said rails cooperatively attached to one another by a cross member, said rails aligned in a substantially vertical manner and said rails having a longitudinal channel formed therein;

(b) interior rails slidably mounted in said channels;

(c) a platform having a front edge, a rear edge, and a first and second side edge; said platform having a generally horizontal operative position;

(d) means for cooperatively connecting said platform along said first and second side edges to said interior rails;

(e) means for raising and lowering said interior rails relative to said opposed parallel rails, whereby said platform is also raised and lowered; and (f) storing means, cooperatively connected to said rails and said platform, for moving said platform to a stored position, whereby said parallel rails remain in their opposed, substantially vertical position and said stored position is beneath the plane formed by the load carrying surface of the vehicle wherein said storing means comprises:

(i) at least one lever arm pivotally mounted to said platform side edge; and (ii) lever engagement means, mounted on said rail, for engaging said lever arm, whereby when said lever arm is engaged with said engagement means and said means for raising said interior rails are actuated, then said platform is propelled to said stored position.

12. The lift gate apparatus according to claim 11, wherein said storing means further comprises biasing means, cooperatively connected to said parallel rails and in cooperative contact with said platform when said platform is in said stored position, for supporting said platform in said stored position and for propelling said platform from said stored position to said operative position.

13. The lift gate apparatus according to claim 12, wherein said biasing means includes:

(a) an arm with a first end and a second end, said arm's first end being pivotably mounted proximate said lever engagement means;

(b) a spring connected to said arm and said rail; and (c) a circumferential member mounted on said arm's second end, whereby when said platform is moved to said stored position, said platform is in contact with said roller biasing said spring.

14. The lift gate apparatus according to claim 13, further comprising:

(a) two arms including a first end and a second end, said first end pivotably mounted to said interior rails; and (b) means for mounting said second end of said arms pivotally on said platform's first and second side edges, whereby when said lifting means are actuated in said platform's operative position, said arms support said platform's rear edge.

15. The lift gate apparatus according to claim 14, whereby said means for mounting said arms' second ends further comprises:

(a) at least two upright members mounted on said platform's side edges, said members extending past the top surface of said platform in a generally perpendicular manner;

(b) means for mounting said arms' second end to said upright members at a vertical elevation above said platform; and (c) means for stopping said arms at approximately said vertical elevation of said means for mounting said arms' second end, whereby when said means for moving said platform to said stored position, said stopping means cause said arms to fold.

16. The lift gate apparatus according to claim 14, wherein said platform is hinged at its approximate midpoint between said platform's front and rear edges.

17. The lift gate apparatus according to claim 16, wherein said hinge allows said platform to fold in said stored position, whereby said front edge and said rear edge of said platform are adjacent to one another.

* * * * *

UNITED STATES PATENT AND TRADEMARK OFFICE
CERTIFICATE OF CORRECTION

PATENT NO. : 4,930,969

DATED : June 5, 1990

INVENTOR(S) : HARTFORD P. LANGER

It is certified that error appears in the above-identified patent and that said Letters Patent is hereby corrected as shown below:

Column 1, line 27, after "factors" insert --are--.
Column 3, line 61, for "DRAWINGS", first occurrence, read --DESCRIPTION--.

Column 10, line 57, for "whereby" read --wherein--.

Signed and Sealed this

Twenty-ninth Day of October, 1991

Attest:

HARRY F. MANBECK, JR.

*Attesting Officer*  *Commissioner of Patents and Trademarks*